2,999,061
BUTADIENE CONVERSION OF $C_4$ FRACTION OF UNSATURATED HYDROCARBONS

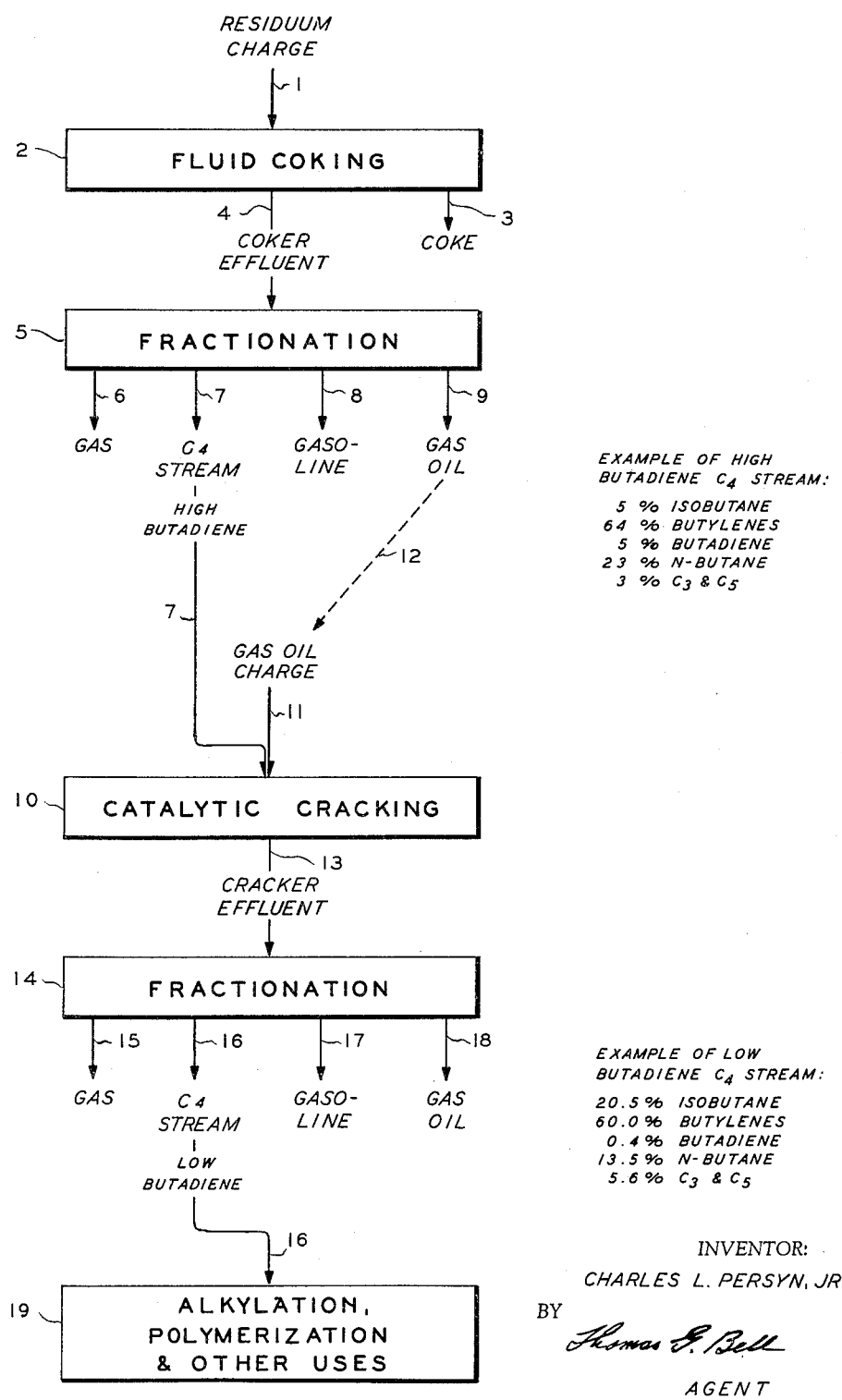

Charles L. Persyn, Jr., Concord, Calif., assignor to Tidewater Oil Company, San Francisco, Calif., a corporation of Delaware
Filed Aug. 27, 1958, Ser. No. 757,503
1 Claim. (Cl. 208—67)

This invention relates to the treatment of hydrocarbons containing four carbon atoms and, more particularly, to the removal of butadiene from a stream of butanes and butylenes. The invention, in a specific embodiment, also relates to the treatment of the effluent gas from high temperature thermal cracking, such as a fluidized coking operation, to prepare its $C_4$ content for alkylation and/or polymerization.

When heavy petroleum stocks are treated by high temperature thermal cracking processes such as fluidized coking and vapor phase cracking to convert them to more desirable lower-boiling products, a substantial amount, i.e., usually between 2% and 10% of the effluent, comprises mixtures of various four carbon atom hydrocarbons. Similarly, when naphthas are subjected to thermal reforming to improve their volatility or antiknock properties, considerable quantities of $C_4$ hydrocarbons are obtained. In the $C_4$ mixture there are substantial amounts of butane, isobutane, and butylenes such as butene-1 and butene-2. All these are useful petroleum products. For example, it is common practice to use such $C_4$ streams as part of the charge to an alkylation process where isobutane is reacted with butylene to obtain an alkylate composed chiefly of branched chain $C_8$ hydrocarbons. Usually, the thermal $C_4$ streams contain more butylenes than isobutane and additional isobutane must be supplied to the alkylation process from other sources. Similarly, it is common practice to charge such $C_4$ streams, in combination or not with olefin containing $C_3$ hydrocarbons, to polymerization processes such as the well-known phosphoric acid polymerization process wherein the olefins are polymerized to obtain gasoline constituents.

However, depending mainly on the temperature used in such thermal processes, the $C_4$ fraction therefrom will contain small but objectionable amounts of butadiene, which may range from 2% to 6% of the $C_4$ fraction or even higher. The presence of butadiene in the charge to an alkylation plant is objectional, forming undesirable amounts of high-boiling polymers with the consumption of excessive amounts of catalyst. Similarly, high-boiling polymers and excessive catalyst use occurs when more than only a minimum amount of butadiene is present in the charge to catalytic polymerization.

Though conditions may vary from one refinery to another, $C_4$ streams containing more than about 0.5% of butadiene are, if possible, rejected as charge for catalytic alkylation or polymerization. Recently, attempts have been made to subject $C_4$ fractions, containing more than about 0.5% butadiene, to a selective hydrogenation treatment wherein the butadiene is converted to butene-1 without substantial conversion of the butylene content to paraffins. Though this has been successful in the preparation of suitable alkylation (or polymerization) feed from high-butadiene-content $C_4$ streams, the procedure necessitates expenditures not only for the additional equipment needed but also for the additional utilities and labor required for this additional processing.

I have found that, when a stream of $C_4$ hydrocarbons is charged to a catalytic cracking plant while the latter is operating under normal conditions to crack gas oil into gasoline and other products, the total $C_4$ fraction obtained from the combined operation will have a butadiene content not over about 0.5%.

An object of the present invention is to reduce the amount of butadiene present in a mixture of four carbon atom hydrocarbons containing objectionable amounts of butadiene.

Another object is to prepare, from a mixture of $C_4$ hydrocarbons having an objectionably high butadiene content, a $C_4$ stream suitable for use in catalytic alkylation or catalytic polymerization by a procedure integrated with the normal functions of a catalytic cracking operation.

Other objects and advantages of the invention may appear from the following description. Broadly, the invention comprises charging a $C_4$ hydrocarbon fraction, containing objectionable amounts of butadiene, into a catalytic cracking plant while the latter is operating under conditions primarily intended for the cracking of gas oil to obtain gasoline. The $C_4$ fraction may be charged to the cracking unit in any desired manner. It may be introduced as a separate stream into the cracking unit, or it may be blended as a liquid with the gas oil feed in storage. A convenient procedure is to inject the $C_4$ mixture (either as a gas or as a liquid) into the stream of gas oil feed as the latter enters the cracking reactor. The products from the cracking operation are fractionated in the usual manner to obtain, among other products, a $C_4$ fraction containing the $C_4$ hydrocarbons obtained from cracking the gas oil mixed with the $C_4$ hydrocarbons obtained from the treatment of the original $C_4$ fraction charged. The $C_4$ product will have a sufficiently low butadiene content to be used as feed to alkylation.

The catalytic cracking operation may be any of the well known forms where relatively heavy hydrocarbon distillates are converted into relatively lighter products by vapor phase contact with silica, alumina, silica-alumina, silica-magnesia and the like catalysts at temperatures in the range of 900° to 1000° F. The catalyst may be present as a "fluidized bed" of powdered catalyst, a "moving bed" of granular catalyst, or as a "fixed bed." Lower temperatures, such as from 800° to 900° F. may be used for the purposes of the invention, i.e., for reducing the butadiene content of the $C_4$ stream charged to the cracking operation, but as is well known, such low temperatures may give objectionably low yields of cracked products, i.e., the conversion of the gas oil charge may be too low. On the other hand, catalytic cracking temperatures much in excess of 1000° F. at normal space-velocities usually produce cracked $C_4$ streams containing over 0.5% of butadiene and, accordingly, would tend to defeat the purposes of the invention.

As stated prior, the $C_4$ fraction to be treated may be any such stream containing objectionable amounts of butadiene (i.e., above about 0.5%). Such $C_4$ fractions are usually obtained from the fractionation of the products of low pressure thermal (i.e., non-catalytic) cracking and reforming operations conducted at temperatures in excess of 900° F. Certain specialized operations using catalysts particularly adapted for dehydrogenation may give a $C_4$ fraction containing appreciable amounts of butadiene. As is well known, in thermal cracking operations the production of butylenes increases rather rapidly as the temperature is increased above about 900° F.; however, with increasing temperature, the production of butadiene increases even more rapidly. As a consequence, refinery $C_4$ streams most suitable for furnishing butylenes for alkylation processes are the least suitable because of their high butadiene content. The invention is especially advantageous for the treatment of $C_4$ fractions obtained from low pressure coking processes, the most important at the present time being fluid coking where residual oils are coked in contact with a fluidized bed of finely divided coke at temperatures upwards from about 950° F.

The invention may be more readily understood by reference to the drawing which is a flow diagram exemplifying processing steps of the invention when used in connection with a $C_4$ stream obtained from a fluidized coking operation.

In the drawing a stream of heavy residual oil (sometimes mixed with lesser amounts of relatively lighter oil) is shown as being introduced through line 1 into fluid coking zone 2. Coke is drawn off as a by-product through line 3, while the hydrocarbon effluent is withdrawn as a vapor through line 4 and passed to fractionating zone 5 (which usually comprises a plurality of fractionating columns together with suitable absorption apparatus) wherein the effluent is fractionated into several streams. A gas stream, containing $C_3$ and lighter hydrocarbons along with non-hydrocarbon gases, is shown as leaving zone 5 through line 6. (Usually the gas stream is further fractionated but such further fractionation is of no importance to the present invention.) A butanes-butylenes ($C_4$) stream, a gasoline stream, and a gas oil stream are represented as leaving respectively through lines 7, 8 and 9. The stream in line 7 will consist mainly of $C_4$ hydrocarbons, although, as is well known, a small amount of $C_3$ and $C_5$ hydrocarbons will be present as a result of the imperfect fractionation obtained in normal commercial operations. The stream in line 7 will contain large amounts of butylenes and lesser amounts of isobutane, both useful for alkylation feed; however, stream 7 will also contain small but objectionable amounts of butadiene. To reduce the butadiene content in accordance with the invention, the $C_4$ stream is charged to catalytic cracking zone 10, together with usual gas oil cracking charge shown as entering zone 10 through line 11. The gas oil charge may be composed of any refinery gas oil fractions, and may contain some or all of gas oil stream 9 as is indicated by dotted line 12. In catalytic cracking zone 10 the gas oil charge from line 11, admixed with the $C_4$ stream from line 7, is subjected to cracking in contact with a suitable cracking catalyst under conditions of temperature and space velocity selected to produce substantial conversion of the gas oil to gasoline. The cracker effluent leaving zone 10 through line 13 passes into fractionating zone 14 where it is fractionated in a manner similar to zone 5 with a gas stream shown as leaving zone 14 through line 15, a $C_4$ stream in line 16, a gasoline stream in line 17 and a gas oil stream in line 18. As is conventional, some or all of gas oil stream 18 may be recycled as part of the charge to cracking zone 10. The $C_4$ stream in line 16, now with a satisfactory butadiene content and with a high butylene content is passed to storage zone 19 for use as feed for alkylation and/or polymerization or for other uses.

Ordinarily no hydrogen is added to the catalytic cracking zone 10, but some hydrogen is formed therein by the gas oil cracking, and hydrogenation of some of the $C_4$ hydrocarbons apparently takes place with consumption of most of the butadiene, with some conversion of butylenes and with resultant increase of isobutane.

The following example is illustrative of the results which may be obtained in commercial operation of the invention:

EXAMPLE 1

About 1,800 barrels per day of a butanes-butylenes (B-B) stream having a butylene content of about 5%, from the products of a fluid coker processing about 43,000 barrels per day of a mixture of residuum and heavy crude at about 980° F., are introduced into the charge of a fluid catalytic cracker while charging about 40,000 barrels per day of gas oils obtained from a mixture of crude oils. The products from the catalytic cracking operation are fractionated into a dry gas stream, a propane-propylene stream, a butanes-butylenes stream, a gasoline stream and a gas oil stream. The butane-butylene stream containing the $C_4$ hydrocarbons resulting from the catalytic cracking of the gas oil in combination with the coker B-B stream, is sufficiently low in butadiene content for favorable use as feed for a sulfuric acid alkylation process. Tables I-A, I-B and I-C indicate operating conditions and products typical for the coking and catalytic cracking operations of this example.

Table I-A.—Coker operations

Feed:
| | |
|---|---:|
| Blended residua, b./d. | 37,000 |
| Mixed heavy crudes, b./d. | 6,000 |
| Total fresh feed (7.5° API), b./d. | 43,000 |
| Recycle, b./d. | 13,000 |
| Gross charge, b./d. | 56,000 |

Operating conditions:
Temperature—
| | |
|---|---:|
| Dense phase, ° F. | 970 |
| Dilute phase, ° F. | 980 |
| Cyclones, ° F. | 1,000 |

Vapor residence—
| | |
|---|---:|
| Dense phase, min. | 10.0 |
| Dilute phase, min. | 6.5 |
| Cyclones, min. | 1.2 |
| Space velocity, WHSV | 0.52 |
| Reactor pressure, top, p.s.i.g. | 11 |
| Reactor steam, wt. percent of fresh feed | 10 |
| Coke circulation, tons/min. | 55 |
| Burner temperature, ° F. | 1,150 |
| Burner pressure, top, p.s.i.g. | 9 |
| Coke burning rate, tons/hr. | 16 |

Yields:
| | |
|---|---:|
| Dry gas, M s.c.f./d. | 25,000 |
| Propane-propylene cut, b./d. | 1,400 |
| Butane-butylene cut, b./d. | 1,800 |
| Gasoline, b./d. | 8,300 |
| Gas oil, b./d. | 22,300 |
| Coke, gross, tons/d. | 1,700 |
| Coke, net, tons/d. | 1,320 |

Table I-B.—Catalytic cracking operations

| | Invention | Normal | Difference |
|---|---:|---:|---:|
| Feed: | | | |
| Mixed Gas Oils, b./d. | 40,000 | 40,000 | |
| Coker B-B Stream, b./d. | 1,800 | | 1,800 |
| Total, b./d. | 41,800 | 40,000 | 1,800 |
| Operating Conditions: | | | |
| Reactor Temperature, °F. | 960 | 960 | |
| Regenerator Temperature, °F. | 1,150 | 1,150 | |
| Reactor Pressure, p.s.i.g. | 21.5 | 21.2 | |
| Regenerator Pressure, p.s.i.g. | 14.5 | 14.5 | |
| Steam, M lb./hr. | 20 | 20 | |
| Catalyst in Reactor, tons | 100 | 100 | |
| Catalyst in Regenerator, tons | 325 | 325 | |
| Space Velocity—Reactor, WHSV | 2.8 | 2.7 | |
| Catalyst: Oil Ratio, wt. percent | 8.3 | 8.3 | |
| Carbon Burning Rate, M lb./hr. | 33 | 32 | |
| Carbon on Regenerated Catalyst, wt. percent | 0.3 | 0.3 | |
| Conversion of Gas Oil, vol. percent | 52.5 | 52.5 | |
| Catalyst Type, Percent Synthetic | 100.0 | 100.0 | |
| Yields: | | | |
| Dry Gas, M s.c.f./d. | 16,200 | 16,000 | 200 |
| Propane-Propylene Cut, b./d. | 1,800 | 1,700 | 100 |
| Butane-Butylene Cut, b./d. | 4,900 | 3,400 | 1,500 |
| Gasoline, 420° E.P., b./d. | 14,000 | 14,000 | 100 |
| Gas Oil, b./d. | 19,000 | 19,000 | |

*Table I–C.—Properties of B–B cuts*

| Butane-Butylene Cut from— | Normal G.O. | | Invention |
|---|---|---|---|
| | Coker | Cat. Crkg. | |
| Volume, b./d. | 1,800 | 3,400 | 4,900 |
| Propanes, Vol. Percent | 0.2 | 2.8 | 2.8 |
| Isobutane, Vol. Percent | 5.0 | 25.0 | 20.5 |
| Butylenes, Vol. Percent | 64.0 | 60.0 | 60.0 |
| Butadiene, Vol. Percent | 5.0 | 0.4 | 0.4 |
| n-Butane, Vol. Percent | 23.0 | 9.0 | 13.5 |
| Pentanes, Vol. Percent | 2.8 | 2.8 | 2.8 |
| | 100.0 | 100.0 | 100.0 |

From the data in Tables I–A, I–B and I–C it will be apparent that, under normal operations, the B–B stream of 1,800 b./d. from the fluid coker would be unsuited for use as feed to an alkylation plant since the butadiene content is 5.0%. Likewise, if the B–B stream from the coker were diluted by adding to it the 3,400 b./d. of B–B obtained from normal operation of the catalytic cracker, there would result 5,200 barrels of B–B stock with a butadiene content of about 2.0%, which is still too high for satisfactory use in sulfuric acid alkylation. However, by charging the 1,800 b./d. of coker B–B stock to the catalytic cracker, along with the usual gas oil charge, there is obtained about 4,900 b./d. of a B–B stock having about 0.4% butadiene, which is quite satisfactory for alkylation. Besides the reduction in butadiene, it will be noted that there is an overall indicated gain in isobutane (about 65 b./d.) accompanied by a reduction in butylenes (about 250 b./d.) and an indicated gain in gasoline of about 100 b./d. when operating according to the invention under the conditions in Tables I. Since the supply of isobutane for alkylation purposes is usually more restricted than that of butylene, the additional isobutane obtained through use of the invention is a further advantage.

Though in commercial operations the supply of coker and similar B–B fractions may be usually less than 10% of the gas oil charged to catalytic cracking, the invention is not limited in its broader aspects to such low ratios of B–B to G.O. charge to the catalytic cracking step. The use of much larger ratios is illustrated by Example 2 comprising experimental runs in a catalytic pilot plant of the type described in "Petroleum Processing" volume 6, December 1951, pages 1370–1373. This pilot plant has proven to be capable of accurate control and correlates closely with the operations of a 40,000 barrel per day commercial "fluid" catalytic cracking plant.

EXAMPLE 2

Two experimental runs were made, one charging gas oil only to the catalytic cracking pilot plant, the other charging a mixture of the same gas oil with abou twice its volume of a $C_4$ fraction sample obtained from a refinery gas plant stabilizing light fractions received from several refinery units including a fluid coker. The original properties of the $C_4$ fraction and of the gas oil are given in Tables II–A, II–B and II–C.

*Table II–A*

ANALYSIS OF HIGH BUTADIENE CONTENT $C_4$ FRACTION

| Hydrocarbon: | Analysis, vol. percent |
|---|---|
| Propane | 0.3 |
| Isobutane | 11.0 |
| Butylene | 46.4 |
| Butadiene | 4.1 |
| n-Butane | 35.0 |
| Isopentane | 1.7 |
| Amylene | 1.4 |
| n-Pentane | 0.1 |
| | 100.0 |

*Table II–B*

CRUDE SOURCE OF CRACKER GAS OIL FEED

| | Vol. percent |
|---|---|
| Wafra gas oil | 36.3 |
| Kuwait gas oil | 24.3 |
| California heavy midwest gas oil | 7.8 |
| Fluid coker gas oil | 17.5 |
| Miscellaneous gas oils | 14.1 |
| | 100.0 |

*Table II–C*

PROPERTIES OF CRACKER GAS OIL FEED

| | |
|---|---|
| Gravity, ° API | 23.1 |
| Viscosity, SSU @ 100° F | 79.2 |
| Viscosity, SSU @ 210° F | 37.0 |
| Pour point, ° F | 70 |
| Nitrogen, wt. percent | 0.19 |
| Nitrogen bases, wt. percent | 0.05 |
| Aniline point, ° F | 144 |
| Sulfur, wt. percent | 2.25 |
| Carbon residue, wt. percent | 0.17 |
| Bromine No. | 26 |
| Wax, wt. percent | 6.0 |
| Ash, wt. percent | Nil |
| Metals, p.p.m.: | |
|   Nickel | 0.11 |
|   Vanadium | 0.011 |
|   Copper | 0.075 |
| U.O.P. K factor | 11.48 |
| Vacuum distillation (corrected to 760 mm. Hg), ° F.: | |
|   I.B.P. | 407 |
|   10% | 541 |
|   50% | 713 |
|   90% | 862 |

The catalytic cracking pilot unit was using low alumina synthetic silica-alumina catalyst composed approximately of 57% of the product sold by American Cyanamid as MS–A, 20.4% of National Aluminate catalytic cracking catalyst, and 22.6% of the same as produced by Davidson. The properties of this catalyst include a U.O.P. weight activity of 35, and a calcined bulk density of 0.737. The metal contamination was found to be 150 p.p.m. of nickel, 100 p.p.m. vanadium, and 10 p.p.m. copper. Cracker operating conditions are shown in Table II–D, and the yields obtained are shown in Table II–E.

*Table II–D*

CATALYTIC CRACKING OPERATING CONDITIONS

| | Mixture | Gas Oil only |
|---|---|---|
| Feed Composition: | | |
|   $C_4$ Fraction (Table II–A), Vol. Percent | 65.6 | |
|   Gas Oil (Tables II–B and II–C), Vol. Percent | 34.4 | 100.0 |
| Reactor: | | |
|   Temperature, °F | 970 | 970 |
|   Pressure, inches of $H_2O$ | 0.8 | 0.6 |
|   Dispersion Steam, lbs./1,000 of catalyst | 3.354 | 2.970 |
|   Stripping Steam, lbs./1,000 of catalyst | 5.197 | 4.605 |
|   Space Velocity, WHSV | 1.64 | 1.64 |
|   Catalyst/Oil Ratio | 8.3 | 9.2 |
| Regenerator: | | |
|   Temperature, °F | 1,165 | 1,040 |
|   Pressure, inches $H_2O$ | 1.3 | 1.2 |
| Carbon on Catalyst: | | |
|   Spent, Wt. Percent | 0.76 | 1.11 |
|   Regenerated, Wt. Percent | 0.12 | 0.50 |

Table II-E
CATALYTIC CRACKING YIELDS

|  | Mixture | Gas Oil Only |
|---|---|---|
| Conversion, Gas Oil Disappearance, Vol. Percent | 52.9 | 52.9 |
| Carbon, Wt. Percent | 5.3 | 5.7 |
| Dry Gas ($C_2$ and Lighter), s.c.f./bbl | 156 | 257 |
| Propane and Propylene, Vol. Percent | 4.6 | 7.5 |
| Total Butanes, Vol. Percent | 59.0 | 6.0 |
| Isobutane, Vol. Percent | 10.9 | 0.2 |
| Butylene, Vol. Percent | 26.7 | 5.3 |
| Butadiene, Vol. Percent | 0.2 | |
| n-Butane, Vol. Percent | 21.2 | 0.5 |
| Debutanized Gasoline ($C_5$ to 390° @ 90%) Yield, Vol. Percent | 16.1 | 35.4 |
| ASTM Distillation, °F.: | | |
| IBP | 110 | 96 |
| 10% | 135 | 128 |
| 50% | 224 | 252 |
| 90% | 390 | 393 |
| E.P. | 426 | 426 |
| Octane Number—ASTM D-908-56: | | |
| Clear | 95.6 | 95.1 |
| +2 ml. TEL/gal | 97.8 | 96.9 |
| +3 ml. TEL/gal | 98.8 | 97.9 |

From the yield data in Table II-E the net yields attributable to the $C_4$ fraction charged to the catalytic cracking pilot plant may be calculated. Such calculated yields are shown in Table II-F in comparison with the composition of the $C_4$ fraction (as given in Table II-A).

Table II-F
ANALYSIS OF $C_4$ FRACTION CHARGED TO CATALYTIC CRACKING COMPARED TO CALCULATED YIELDS ATTRIBUTABLE TO SAID $C_4$ FRACTION

|  | $C_4$ Fraction of Charge (Table II-A) | Calculated Net Yields from $C_4$ Fraction (Calc. from Table II-E) |
|---|---|---|
| Carbon, Wt. percent | | 5.0 |
| Dry Gas, s.c.f./Bbl | | 103 |
| Volume Percent: | | |
| Propane-Propylene | 0.3 | 3.1 |
| Isobutane | 11.0 | 16.5 |
| Butylenes | 46.4 | 37.9 |
| Butadiene | 4.1 | 0.3 |
| n-Butane | 35.0 | 32.1 |
| Pentanes | 3.2 | |
| Debutanized Gasoline | | 6.0 |

It will be noted from Table II-F that there is indicated (a) over 90% reduction in the butadiene content, (b) a significant gain in isobutane, (c) a loss of about one-fifth of the butylenes which, though a disadvantage, is not objectionable in view of the favorable increase in isobutane, and (d) a production of a small amount of debutanized gasoline (which by analysis not shown in the tables contains a major amount of hydrocarbons of more than five carbon atoms).

These pilot plant results indicate that satisfactory reduction in butadiene content of $C_4$ fractions, high in butylene content, is obtained even when the volumetric ratio of the $C_4$ fraction to gas oil charged to the catalytic cracking unit is as high as 2:1. Satisfactory results may be expected at even higher ratios such as 3:1 and possibly higher.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

A process for substantially eliminating the amount of butadienes present in a stream of four carbon atom hydrocarbons high in butylene content but containing an undesirable amount of butadiene, said stream being suitable for at least part of the charge to an alkylation operation wherein isobutene is alkylated with butylene to form a gasoline alkylate, comprising: thermally cracking a substantially residual oil at a temperature between 800° and 1000° F. to obtain substantial amounts of lighter hydrocarbons including substantial amounts of butylenes and necessarily including objectionable amounts of butadiene; catalytically cracking a gas oil stream under conditions to produce substantial amounts of lighter hydrocarbons including additional amounts of butylenes and no objectionable amounts of butadiene; fractionating from the products of the thermal cracking step a first $C_4$ stream containing the butylenes and butadiene resulting therefrom; feeding said first $C_4$ stream into the catalytic cracking step to mix with the gas oil vapors undergoing cracking, said first $C_4$ stream undergoing only the same amount of cracking as said gas oil vapors; and fractionating from the products of the catalytic cracking step a second $C_4$ stream containing butylenes resulting from the catalytic cracking of the gas oil and butylenes resulting from the thermal cracking of the residual oil, said second $C_4$ stream containing no objectionable amounts of butadiene.

References Cited in the file of this patent

UNITED STATES PATENTS

| 2,343,770 | Hemminger | Mar. 7, 1944 |
| 2,432,537 | Newton | Dec. 16, 1947 |
| 2,705,698 | Hamner | Apr. 5, 1955 |
| 2,731,508 | Jahnig et al. | Jan. 17, 1956 |

UNITED STATES PATENT OFFICE
CERTIFICATE OF CORRECTION

Patent No. 2,999,061　　　　　　　　　　　　　September 5, 1961

Charles L. Persyn, Jr.

It is hereby certified that error appears in the above numbered patent requiring correction and that the said Letters Patent should read as corrected below.

Column 8, line 23, for "isobutene" read -- isobutane --.

Signed and sealed this 10th day of July 1962.

(SEAL)
Attest:

ERNEST W. SWIDER
Attesting Officer

DAVID L. LADD
Commissioner of Patents